US007475343B1

(12) United States Patent
Mielenhausen (10) Patent No.: US 7,475,343 B1
(45) Date of Patent: Jan. 6, 2009

(54) DATA PROCESSING APPARATUS AND METHOD FOR CONVERTING WORDS TO ABBREVIATIONS, CONVERTING ABBREVIATIONS TO WORDS, AND SELECTING ABBREVIATIONS FOR INSERTION INTO TEXT

(76) Inventor: Thomas C. Mielenhausen, 1515 Osceola Ave., St. Paul, MN (US) 55105

( * ) Notice: Subject to any disclaimer, the term of this patent is extended or adjusted under 35 U.S.C. 154(b) by 0 days.

(21) Appl. No.: 09/309,831

(22) Filed: May 11, 1999

(51) Int. Cl.
*G06F 17/00* (2006.01)
(52) U.S. Cl. ..................................... 715/261
(58) Field of Classification Search ................ 707/534, 707/540; 715/534, 540, 536, 532, 530, 261, 715/256, 259; 704/8–10
See application file for complete search history.

(56) References Cited

U.S. PATENT DOCUMENTS

| | | | | |
|---|---|---|---|---|
| 4,355,370 | A | | 10/1982 | Yanagiuchi |
| 4,459,049 | A | * | 7/1984 | Howell et al. .................. 400/98 |
| 4,744,050 | A | * | 5/1988 | Hirosawa et al. ............... 704/4 |
| 4,760,528 | A | * | 7/1988 | Levin .......................... 400/98 |
| 4,773,009 | A | * | 9/1988 | Kucera et al. ............... 715/531 |
| 4,866,646 | A | * | 9/1989 | Nakamura et al. ........... 708/141 |
| 4,891,786 | A | * | 1/1990 | Goldwasser ................ 715/534 |
| 4,991,094 | A | | 2/1991 | Fagan et al. |
| 4,994,968 | A | * | 2/1991 | Kato et al. .................. 715/540 |
| 5,096,423 | A | * | 3/1992 | Goldwasser ................ 434/118 |
| 5,410,475 | A | * | 4/1995 | Lu et al. ........................ 704/1 |
| 5,623,406 | A | * | 4/1997 | Ichbiah .......................... 704/3 |
| 5,634,084 | A | * | 5/1997 | Malsheen et al. ............ 704/260 |
| 5,691,708 | A | * | 11/1997 | Batchelder et al. ......... 340/7.29 |
| 5,781,891 | A | * | 7/1998 | Dvorak et al. ................. 705/2 |
| 5,850,629 | A | * | 12/1998 | Holm et al. ................. 704/260 |
| 5,860,653 | A | * | 1/1999 | Jacobs ........................ 273/272 |
| 5,949,961 | A | * | 9/1999 | Sharman ..................... 704/260 |
| 5,960,385 | A | * | 9/1999 | Skiena et al. .................. 704/9 |
| 6,172,675 | B1 | * | 1/2001 | Ahmad et al. ............ 715/500.1 |

(Continued)

OTHER PUBLICATIONS

Schmitt et al, An Experimental Study of Synthesized Speech Intelligibility Using Text Created Telecommunication Device fo the Deaf (TDD) Users, IEEE, Dec. 1990, pp. 996-999, vol. 2.*

(Continued)

*Primary Examiner*—Cong-Lac Huynh
(74) *Attorney, Agent, or Firm*—Nelson R. Capes; Briggs and Morgan, P.A.

(57) ABSTRACT

A data processing method and apparatus for maintaining and customizing a list of words, phrases, and abbreviations that are standard in a profession, industry, trade or occupation, for insertion of abbreviations from the list into the text, for converting selected words and phrases in the text to abbreviations, for converting selected abbreviations in the text to words and phrases, and for automatically converting a number of words and phrases to abbreviations, and abbreviations to words and phrases, throughout the text, comprising the steps of: storing in a memory a first data structure encoding a plurality of words and corresponding abbreviations; storing in a memory a second data structure encoding a plurality of abbreviations and corresponding words; selecting a word in the text to be converted to an abbreviation and converting the selected word to a corresponding abbreviation using the first data structure; and selecting an abbreviation in the text to be converted to a word and converting the abbreviation to a word using the second data structure.

10 Claims, 8 Drawing Sheets

U.S. PATENT DOCUMENTS

| | | | |
|---|---|---|---|
| 6,192,345 B1* | 2/2001 | Chicorel | 235/375 |
| 6,279,018 B1* | 8/2001 | Kudrolli et al. | 715/234 |
| 6,459,910 B1* | 10/2002 | Houston | 455/563 |
| 6,490,548 B1* | 12/2002 | Engel | 704/10 |
| 6,529,911 B1* | 3/2003 | Mielenhausen | 707/100 |
| 2002/0169770 A1* | 11/2002 | Kim et al. | 707/5 |
| 2003/0115049 A1* | 6/2003 | Beutnagel et al. | 704/220 |
| 2003/0115213 A1* | 6/2003 | Mielenhausen | 707/103 R |
| 2004/0083199 A1* | 4/2004 | Govindugari et al. | 707/1 |
| 2004/0249819 A1* | 12/2004 | Matsumoto et al. | 707/10 |
| 2006/0112133 A1* | 5/2006 | Ljubicich et al. | 707/102 |
| 2007/0282608 A1* | 12/2007 | Conkie | 704/260 |
| 2007/0288558 A1* | 12/2007 | Land et al. | 709/203 |

OTHER PUBLICATIONS

Barrett et al., Abbreviating words systematically, ACM May 1960, pp. 323-324.*

Anquetil et al., Extracting concepts from file names ; a new file clustering criterion, IEEE Apr. 1998, pp. 84-93.*

Bourne et al., A study of methods for systematically abbreviating English words and names, ACM Oct. 1961, pp. 538-552.*

Spiegel et al., Database Preprocessing and Human-Interface Issues in Reverse Directory Assistance (ACNA) Services, IEEE Oct. 1996, pp. 105-110.*

Anonymous, A Shortcut for Inserting Preformatted Text, Inside Corel WordPerfect Suite, Jan. 1998, vol. 3, p. 19, 2 pgs.*

Shaw et al., Microsoft Office 6-in-1, Que Corporation 1994, pp. 171-172, 212-213.*

Laitinent et al., Enhancing Maintainability of Source Programs through Disabbreviation, Google 1997, pp. 117-128.*

Web page for Corel Products, Features and Benefits, 1997 Corel Corporation, last updated: Oct. 29, 1997.

Web page for Oberon, Product Information, last modified Jan. 20, 1999.

Web Page for Year 2000, CiteRite II, 1999 Lexis-Nexis.

Moulton, Bryan et al.: "A System for Automatic Abbreviation Expansion" Proc of the Resna '99 Annual Conference, Jun. 25-29, 1999, pp. 55-57, XP002166602, abstract, section: Background.

* cited by examiner

DATA PROCESSING APPARATUS AND METHOD FOR CONVERTING WORDS TO ABBREVIATIONS, CONVERTING ABBREVIATIONS TO WORDS, AND SELECTING ABBREVIATIONS FOR INSERTION INTO TEXT

BACKGROUND OF THE INVENTION

A number of professions, industries, trades and occupations use standard abbreviations for certain words and phrases. The data processing apparatus and method of this patent application enables users of word processing programs automatically to convert those words and phrases to the standard abbreviations, and to convert said abbreviations to their corresponding words and phrases, in a manner similar to a spell-checking apparatus and method. The data processing apparatus and method of this patent application also enables users of word processing programs to select from a list of standard abbreviations for insertion into the text. The data processing apparatus and method of this patent application also allows for adding to, editing, updating and customizing the list of words and phrases and of abbreviations which are to correspond to each other within the apparatus and method.

A number of existing products have some, but not all, features of the present invention. For example, the CiteRite™ II software from Lexis-Nexis checks legal citations only for proper form and flags errors. This software is not general enough to use with abbreviations in other fields, and does not convert abbreviations to words. The Oberon Citation7 software supports the proper generation of citations with abbreviations from user-defined tables, but does not convert abbreviations to words or allow the user to select from a list of abbreviations corresponding to a given word. The Quickwords™ software from Corel only works with a single word processor, WordPerfect™, and only converts words to abbreviations, not abbreviations to words.

There is a need for a completely generalized word-to-abbreviation and abbreviation-to-word converter program that works with any type of text containing abbreviations from any profession, industry, trade, or occupation. The software program must allow the user to select the word or abbreviation to be converted and should provide the user with a list of possible conversions. The program should also scan an entire text for a word or abbreviation to be converted and automatically make the conversion.

SUMMARY OF THE INVENTION

A data processing method for maintaining and customizing a list of words, phrases, and abbreviations that are standard in a profession, industry, trade or occupation, for automatic insertion of abbreviations from the list into the text, for converting selected words and phrases in the text to abbreviations, for converting selected abbreviations in the text to words and phrases, and for automatically converting a number of words and phrases to abbreviations, and abbreviations to words and phrases, throughout the text, comprising the steps of:
  a) storing in a memory a first data structure encoding a plurality of words and corresponding abbreviations;
  b) storing in a memory a second data structure encoding a plurality of abbreviations and corresponding words;
  c) selecting a word in the text to be converted to an abbreviation and converting the selected word to a corresponding abbreviation using the first data structure; and
  d) selecting an abbreviation in the text to be converted to a word and converting the abbreviation to a word using the second data structure.

A data processing method for maintaining and customizing a list of words, phrases, and abbreviations that are standard in a profession, industry, trade or occupation and for allowing the user to insert abbreviations from the list at any position in a text, comprising the steps of:
  a) storing in a memory a first data structure encoding a plurality of words and corresponding abbreviations;
  b) the user instructing the data processing method to select a position in the text for insertion of an abbreviation;
  c) displaying a list of words and corresponding abbreviations from the first data structure;
  d) the user instructing the data processing method to select an abbreviation from the list; and
  e) inserting the selected abbreviation at the selected position in the text.

A data processing apparatus for maintaining and customizing a list of words, phrases, and abbreviations that are standard in a profession, industry, trade or occupation, for automatic insertion of abbreviations from the list into the text, for converting selected words and phrases in the text to abbreviations, for converting selected abbreviations in the text to words and phrases, and for automatically converting a number of words and phrases to abbreviations, and abbreviations to words and phrases, throughout the text, comprising:
  a) a computer having a memory, a central processing unit, and an input/output unit;
  b) a first data structure recorded in the memory, the first data structure encoding a plurality of words and corresponding abbreviations;
  c) a second data structure recorded in the memory, the second data structure encoding a plurality of abbreviations and corresponding words;
  d) the text in the memory containing words and abbreviations; and
  e) a computer program executing in the central processing unit and defining structural and functional relationships among the plurality of words and the plurality of abbreviations, the computer program receiving information on the selected words and abbreviations from an operator through the input/output unit, and the computer program responding to operator selection of words and abbreviations, converting selected words to corresponding abbreviations, converting selected abbreviations to corresponding words, and inserting abbreviations into the text.

A principal object and advantage of the data processing apparatus and method is that it enables users of any word processing program automatically to convert words and phrases to abbreviations that are standard in a profession, industry, trade or occupation, and to convert abbreviations to their corresponding words or phrases, in a manner similar to a spell-checking apparatus and method.

A second principal object and advantage of the data processing apparatus and method is that it allows for adding to, editing, updating and customizing the list of words and phrases and abbreviations which are to correspond to each other within the apparatus and method.

A third principal object and advantage of the data processing apparatus and method is that it enables the user automatically to insert said abbreviations into the text from said list.

A fourth principal object and advantage of the data processing apparatus and method is that it can scan an entire text for instances of a selected word or abbreviation and automatically convert each instance to the corresponding abbreviation or word.

A fifth principal object and advantage of the data processing apparatus and method is that it displays a list of possible conversions from which the user can select.

DETAILED DESCRIPTION OF THE PREFERRED EMBODIMENTS

Figure 1:
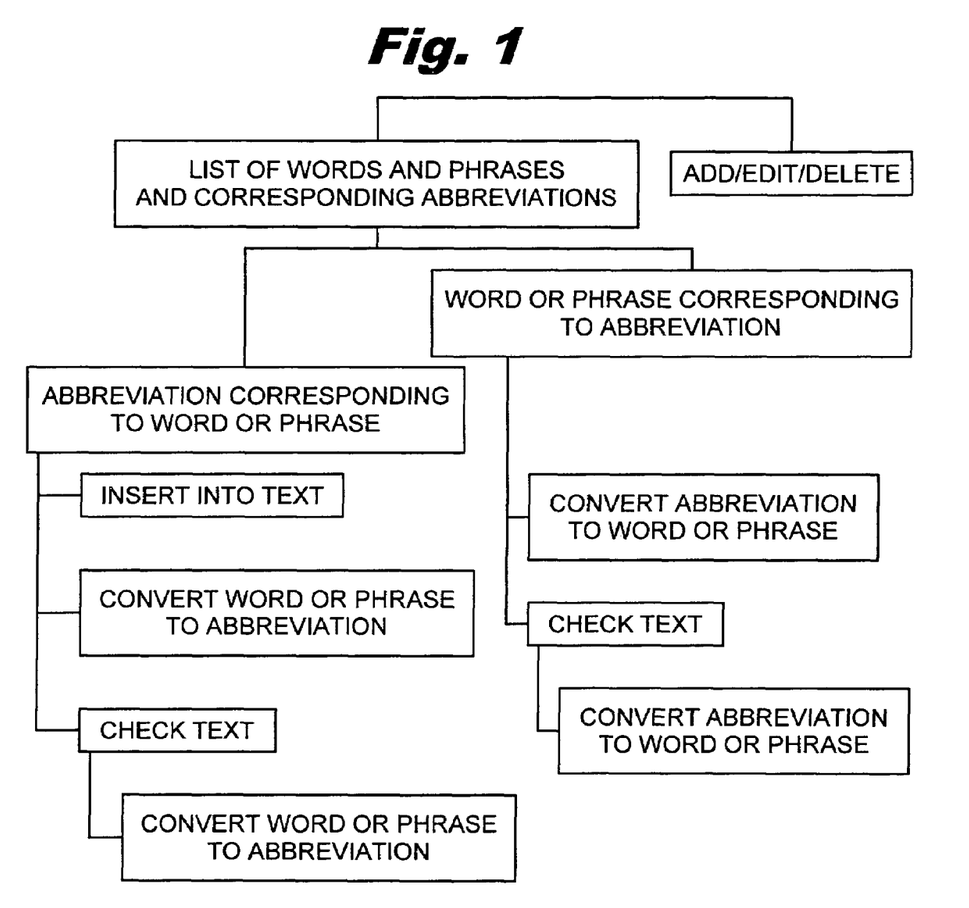
FIG. 1 is a block diagram of the principal functions of the data processing method and apparatus.
Figure 2A:
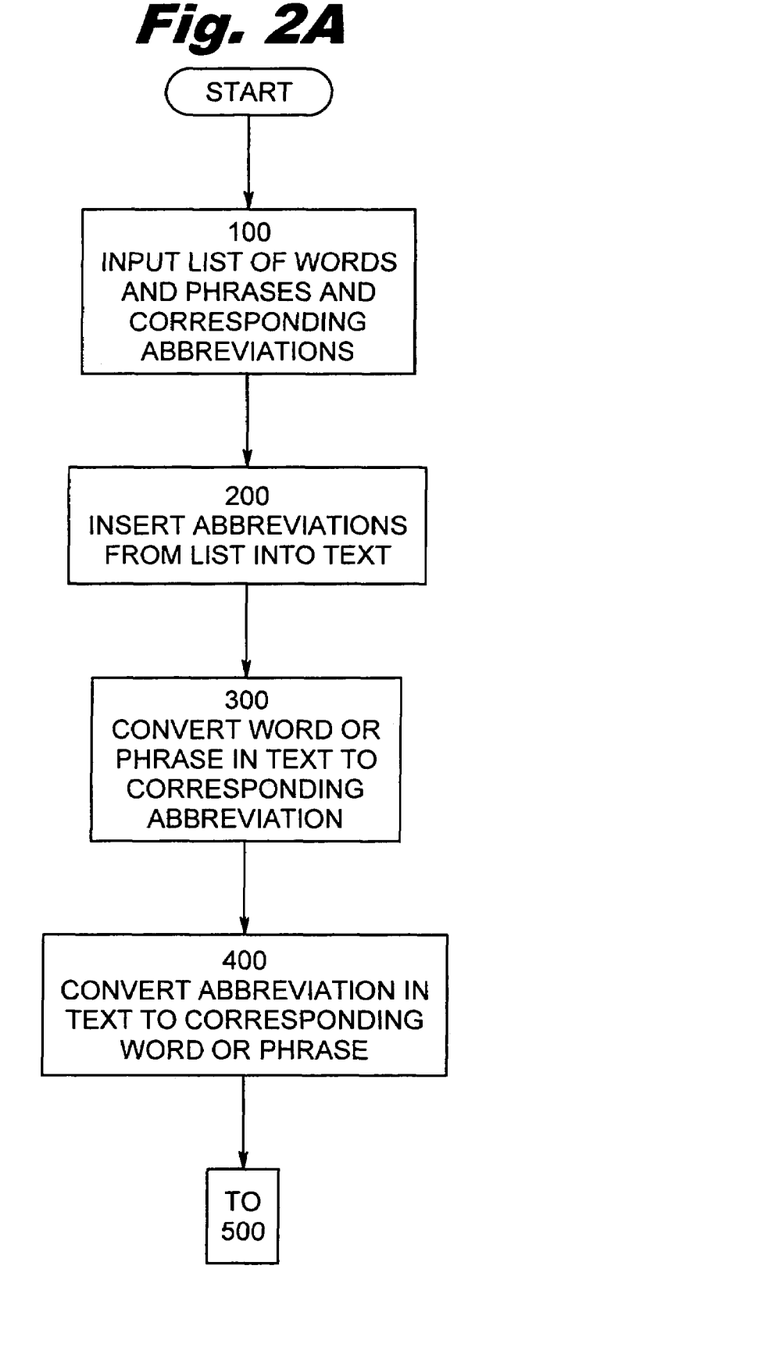
FIG. 2 is a flowchart of the data processing method.
Figure 2B:
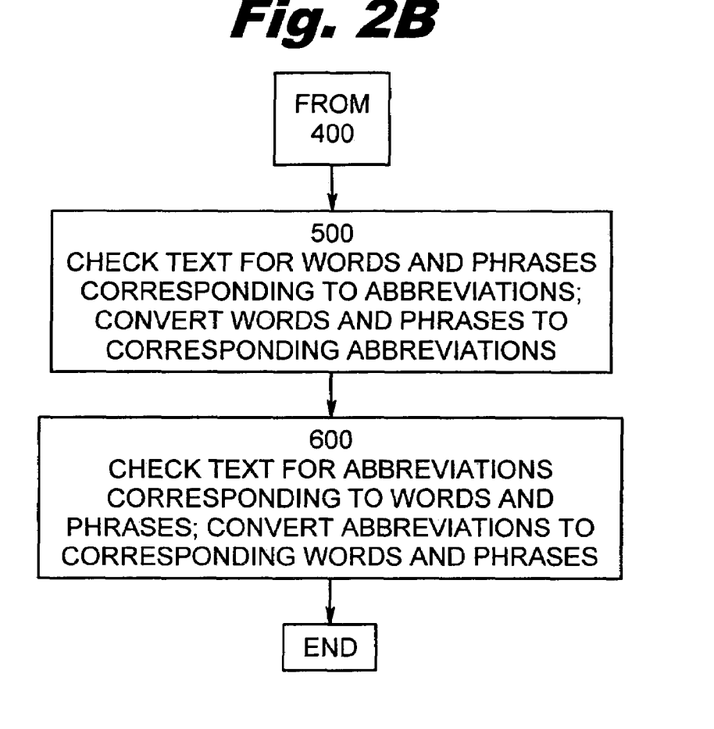
Figure 2C:
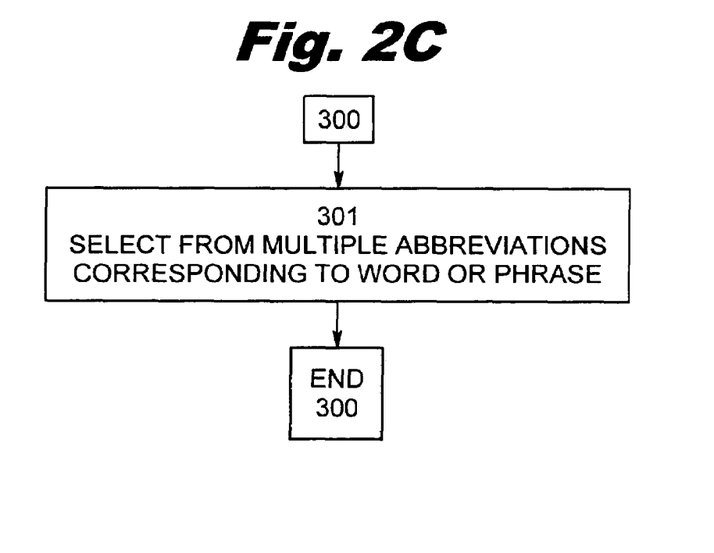
Figure 2D:
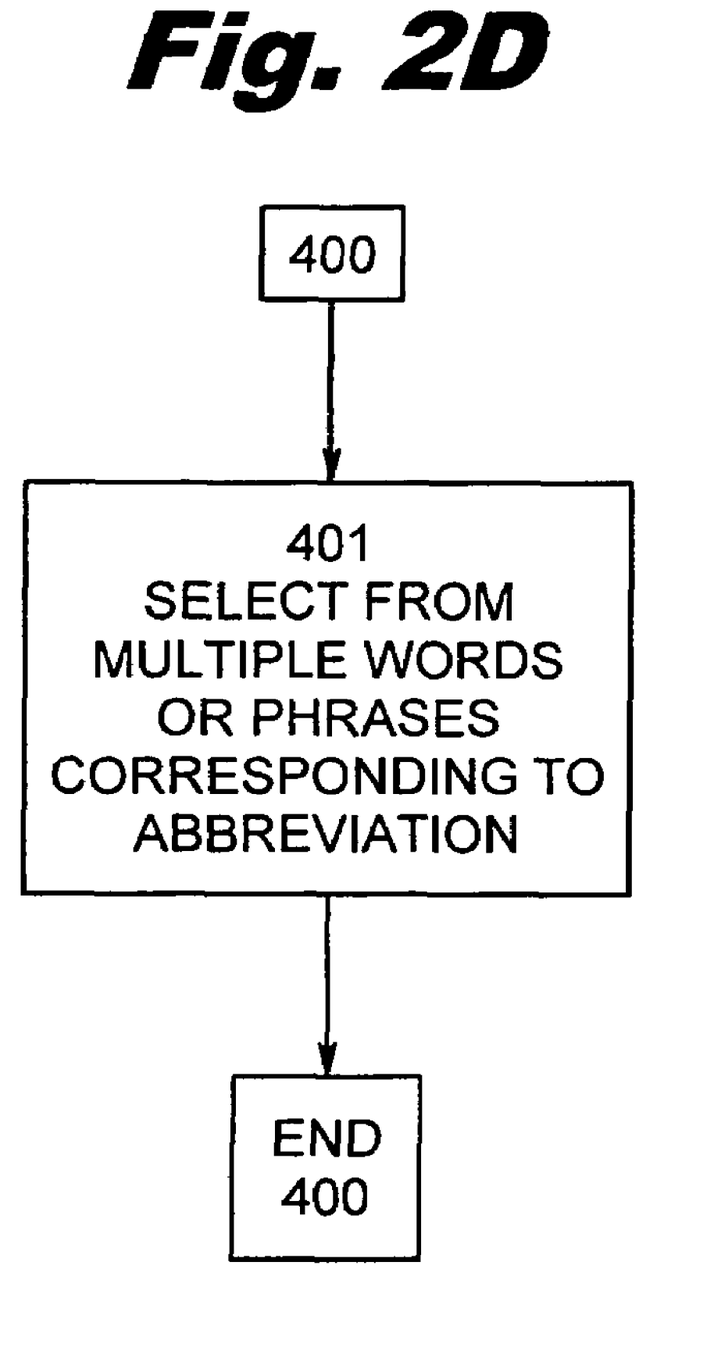

The data processing apparatus and method for converting words and phrases to abbreviations, and converting abbreviations to words and phrases, is illustrated in the attached block diagram (FIG. 1), whose functions are explained further in the flowcharts. It will be understood by one of ordinary skill in the art that FIG. 1 also serves as a pictorial description of the data structures created by the apparatus in order to carry out the described data processing.

A flowchart of the data processing method of the present invention is presented in FIG. 2. It should be understood the order of execution of these steps is not critical.

Illustrative windows for the apparatus's features are shown in FIGS. 3 through 6.

Step 100: Adding to, editing, updating and customizing a list of words and phrases and corresponding abbreviations.

Figure 3:
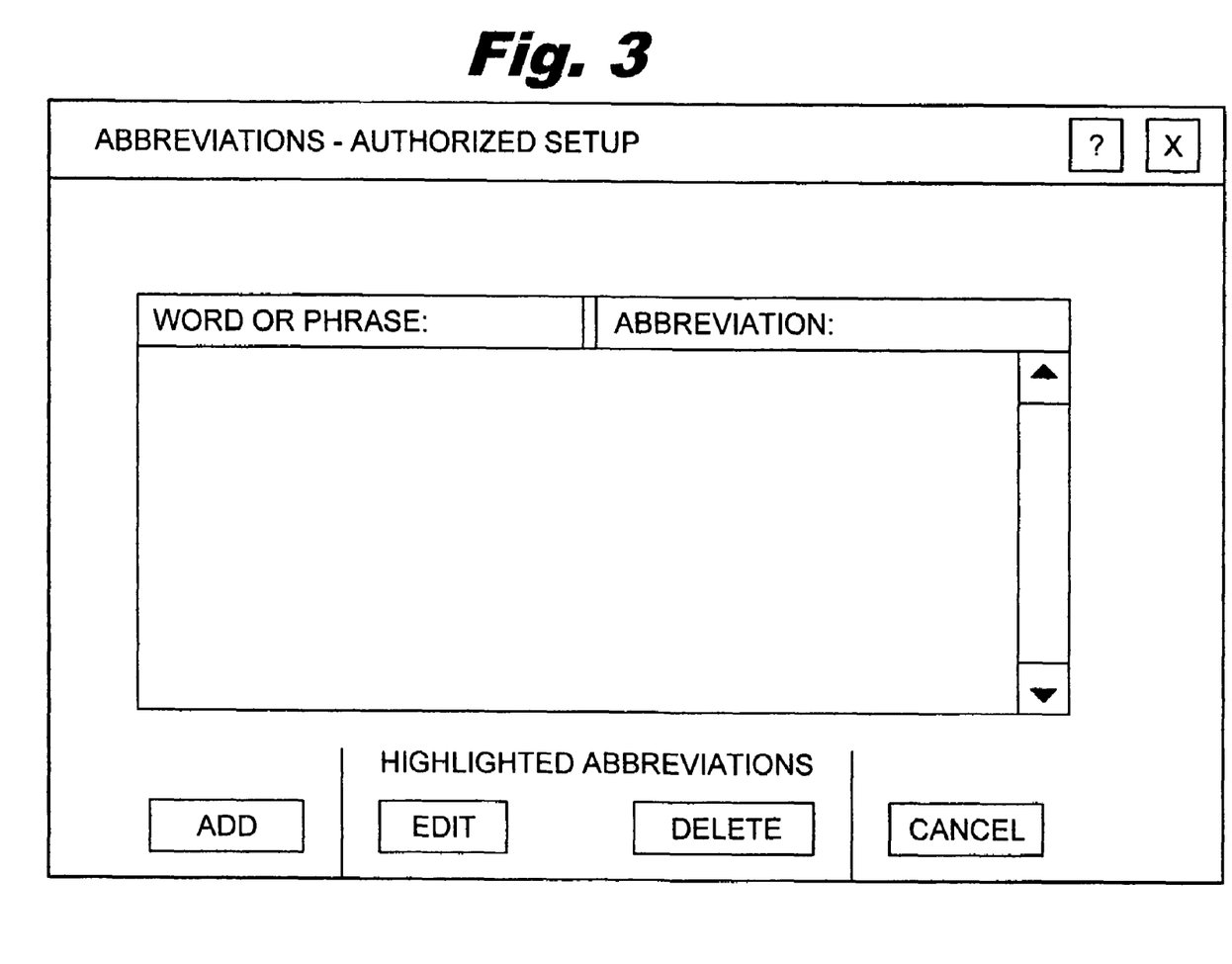
FIG. 3 is a schematic of the window which displays the list of abbreviations, from which the user can add to, edit, update and customize the list of words and phrases and abbreviations which are to correspond to each other.

The data processing apparatus and method allows the user to add to, edit, update and customize a pre-defined list of words and phrases and corresponding abbreviations that are standard in various professions, industries, trades and occupations. The utility of the data processing apparatus and method is therefore dynamic. The list of words and phrases and abbreviations may be modified based on the unique needs of the user and developments in various professions, industries, trades and occupations. FIG. 3 is a schematic of the window which displays, and enables the user to modify, the list of words and phrases and corresponding abbreviations described above.

Step 200: Inserting abbreviations from said list into the text.

Figure 4:
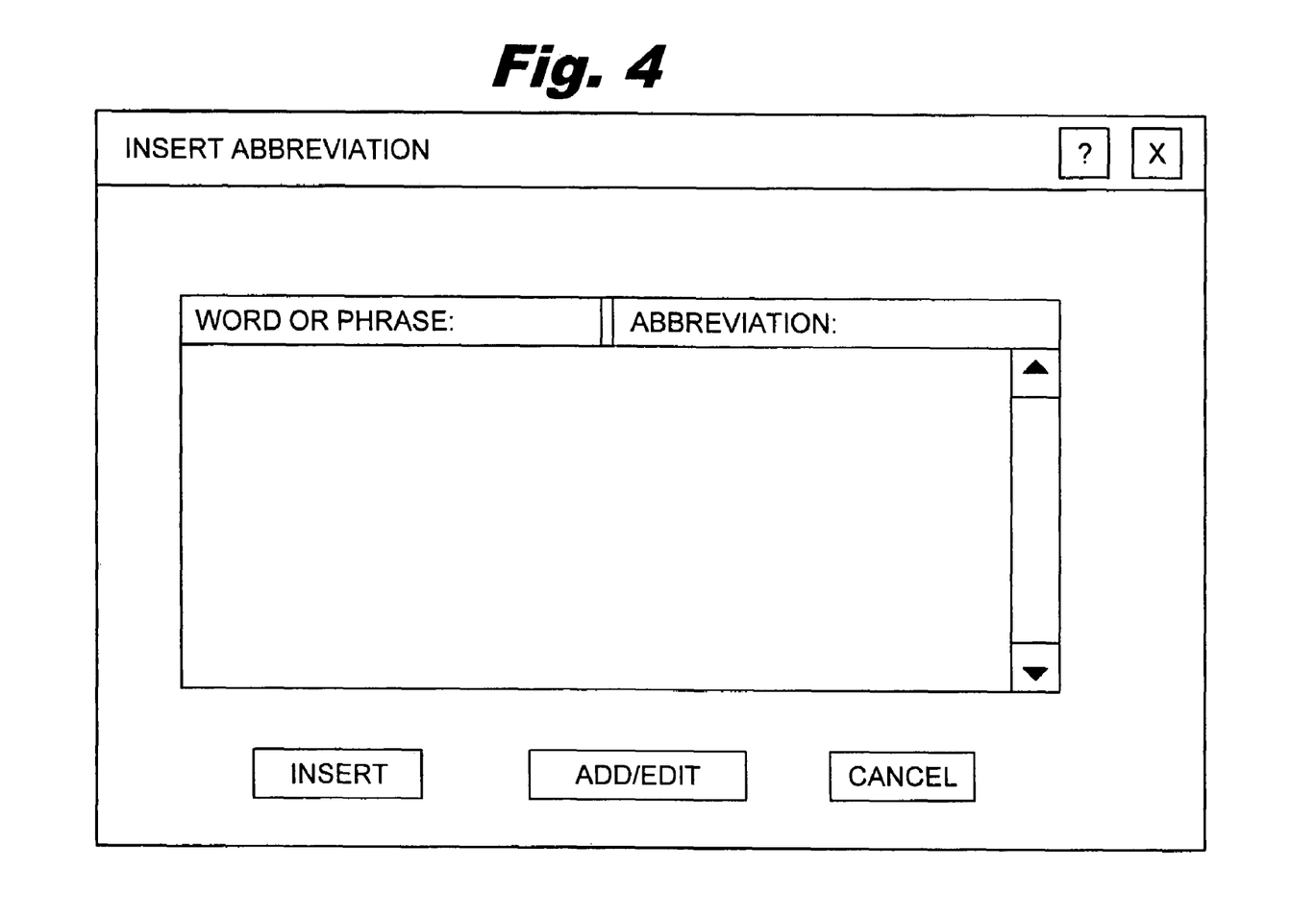
FIG. 4 is a schematic of the window which displays the list of abbreviations, from which the user can insert an abbreviation into the text.
Figure 5:
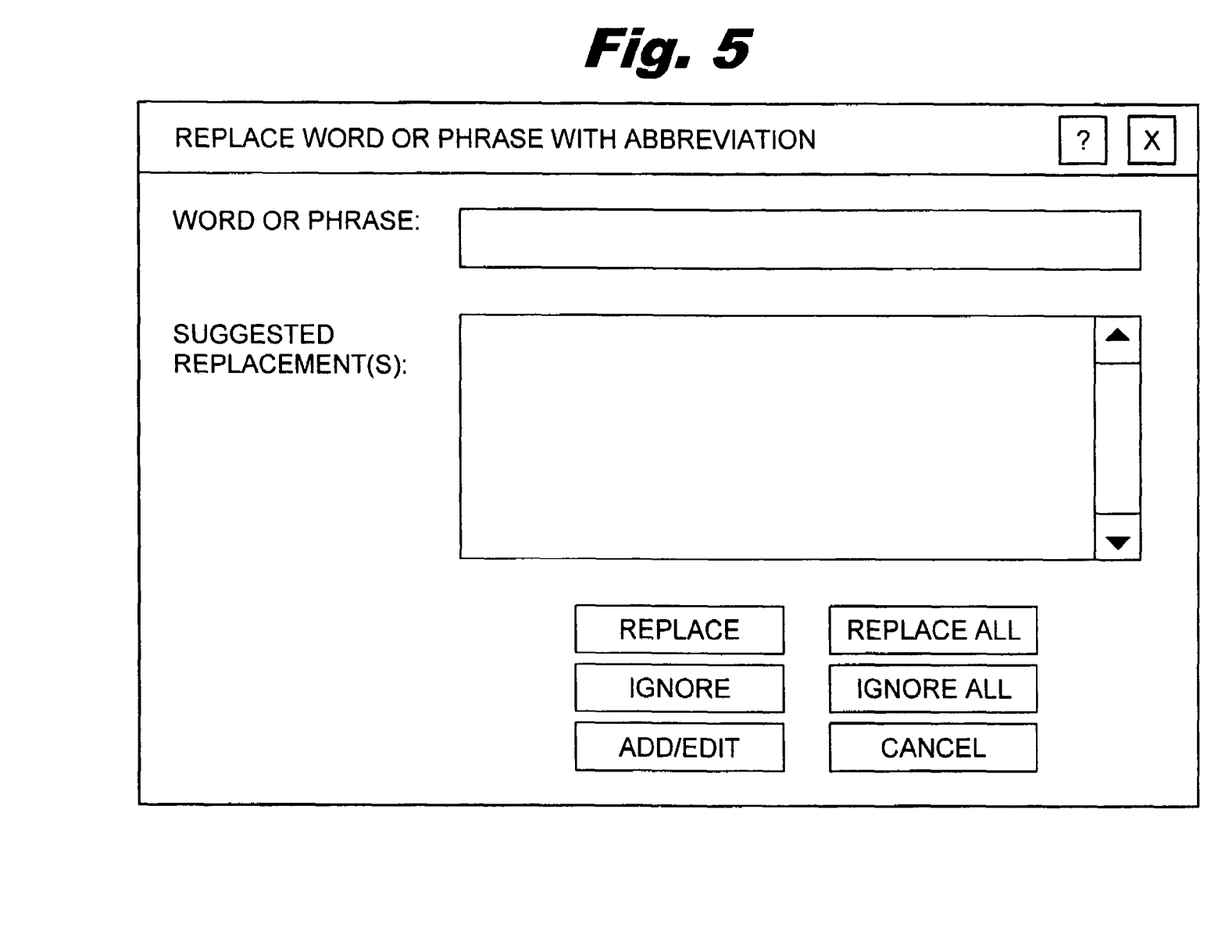
FIG. 5 is a schematic of the window which suggests and enables the user to select from conversions of a word or phrase with more than one corresponding abbreviation.
Figure 6:
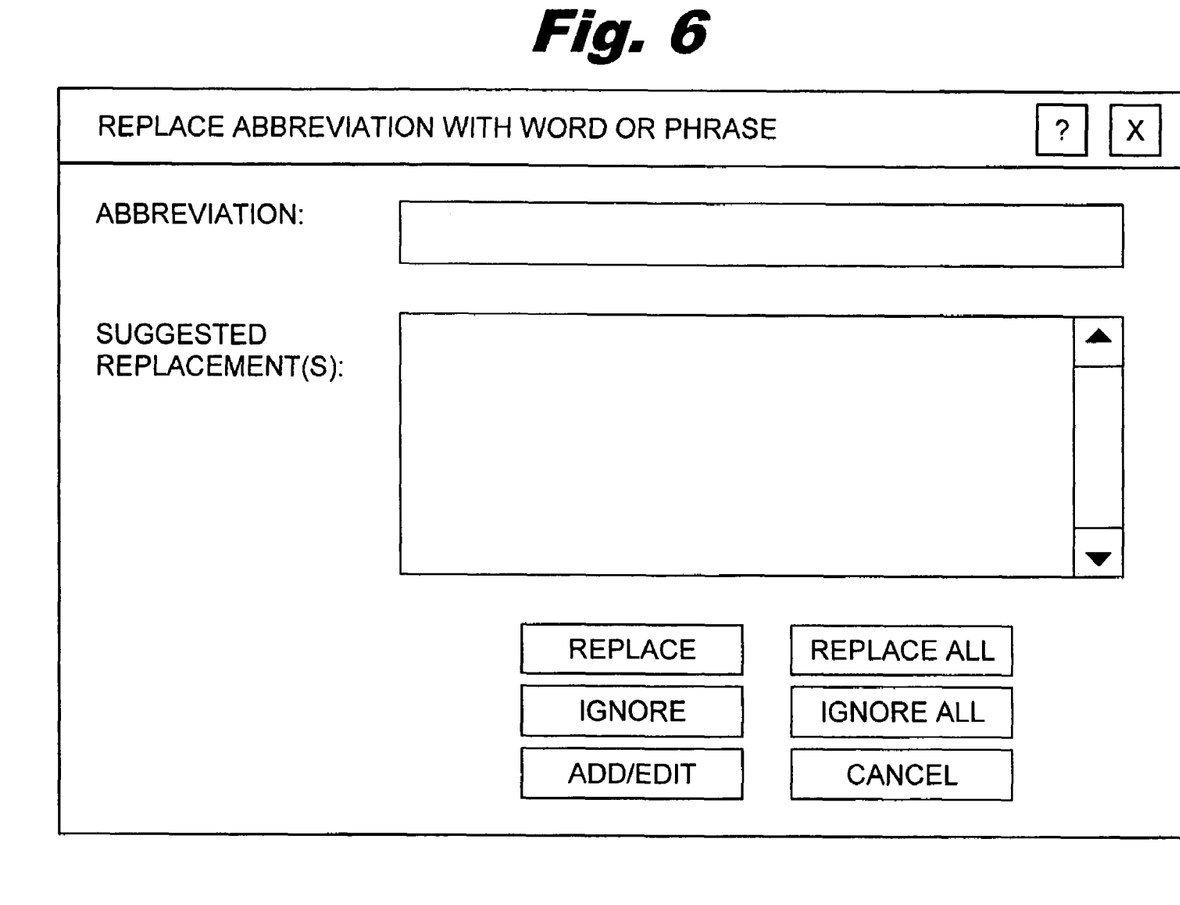
FIG. 6 is a schematic of the window which suggests and enables the user to select from conversions of an abbreviation with more than one corresponding word or phrase.

The user can automatically insert an abbreviation into the text via a window which displays the list of words and phrases and corresponding abbreviations described in Step 100 above. The user can open the window via a mouse or keyboard command. FIG. 4 is a schematic of the window.

Step 300: Converting a word or phrase in the text to a corresponding abbreviation.

Step 400: Converting an abbreviation in the text to a corresponding word or phrase.

The user can automatically convert a word or phrase in the text to a corresponding abbreviation by highlighting the word or phrase and initiating conversion via a mouse or keyboard command. Likewise, the user can convert an abbreviation in the text to a corresponding word or phrase by highlighting said abbreviation and initiating conversion via a mouse or keyboard command. The mouse command involves pointing the cursor at an on-screen button or drop-down menu item.

Step 301: Selecting from multiple abbreviations corresponding to a word or phrase.

Step 401: Selecting from multiple words or phrases corresponding to an abbreviation.

Occasionally more than one abbreviation corresponds to a word or phrase, and more than one word or phrase corresponds to an abbreviation. If this situation applies to an abbreviation or word or phrase that the user is converting (as described in Steps 300 and 400 above), the window depicted in FIG. 5 or FIG. 6 opens. The window depicted in FIG. 5 enables the user to select from suggested conversions of a word or phrase with more than one corresponding abbreviation. The window depicted in FIG. 6 enables the user to select from suggested conversions of an abbreviation with more than one corresponding word or phrase.

Step 500: Checking the text for words and phrases corresponding to abbreviations, and converting said words and phrases to said abbreviations.

Step 600: Checking the text for abbreviations corresponding to words and phrases, and converting said abbreviations to said words or phrases.

The data processing apparatus and method enables the user to perform an abbreviation check of an entire text. The check can be initiated via a mouse or keyboard command. The mouse command involves pointing the cursor at an on-screen button or drop-down menu item.

The user can check the text for words and phrases corresponding to abbreviations, and converting said words and phrases to said abbreviations, via a window that suggests said conversions. The window is similar to that depicted in FIG. 5.

The user can check the text for abbreviations corresponding to words and phrase, and converting said abbreviations to said words and phrases, via a window that suggests said conversions. The window is similar to that depicted in FIG. 6.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A data processing method for maintaining and customizing a list of words, phrases, and abbreviations that are standard in a profession, industry, trade or occupation, for insertion of abbreviations from the list into a pre-existing text, for converting selected words and phrases in the pre-existing text to abbreviations, for converting selected abbreviations in the pre-existing text to words and phrases, and for automatically converting a number of words and phrases to abbreviations, and abbreviations to words and phrases, throughout the pre-existing text, comprising the steps of:

(a) storing in a memory a first data structure encoding a plurality of words and corresponding abbreviations;

(b) storing in a memory a second data structure encoding a plurality of abbreviations and corresponding words;

(c) the user actively selecting a word at any position in the pre-existing text to be converted to an abbreviation, displaying a list of suggested abbreviations corresponding to the selected word and receiving input from the user to choose the desired abbreviation, converting the selected word to a corresponding abbreviation using the first data structure, and replacing the word with the corresponding abbreviation; and (d) the user actively selecting an abbreviation at any position in the pre-existing text to be converted to a word, displaying a list of suggested words corresponding to the selected abbreviation and receiving input from the user to choose the desired word, converting the selected abbreviation to a corresponding word using the second data structure, and replacing the abbreviation with the corresponding word;

(e) scanning the pre-existing text for words to be converted to abbreviations and converting words selected by the data processing method to corresponding abbreviations using the first data structure, and replacing the words in the pre-existing text with the corresponding abbreviations;

(f) scanning the pre-existing text for abbreviations to be converted to words and converting abbreviations selected by the data processing method to corresponding words using the second data structure and replacing the abbreviations in the pre-existing text with the corresponding words.

2. The method of claim 1, further comprising the step of adding to, editing, updating and customizing the first data structure and second data structure.

3. The method of claim 1, wherein the word is selected by the user using a keyboard command.

4. The method of claim 1, wherein the word is selected by the user using a mouse.

5. The method of claim 1, wherein the abbreviation is selected by the user using a keyboard command.

6. The method of claim 1, wherein the abbreviation is selected by the user using a mouse.

7. A data processing method for maintaining and customizing a list of words, phrases, and abbreviations that are standard in a profession, industry, trade or occupation and for allowing the user to insert abbreviations from the list at any position in a pre-existing text, comprising the steps of:

(a) storing in a memory a first data structure encoding a plurality of words and corresponding abbreviations;

(b) the user instructing the data processing method to select a position anywhere in the pre-existing text for insertion of an abbreviation;

(c) displaying a list of words and corresponding abbreviations from the first data structure;

(d) the user instructing the data processing method to select an abbreviation from the list; and (e) inserting the selected abbreviation at the selected position in the pre-existing text.

8. The data processing method of claim 7, further comprising a step of adding to, editing, updating and customizing the first data structure and second data structure.

9. A data processing apparatus for maintaining and customizing a list of words, phrases, and abbreviations that are standard in a profession, industry, trade or occupation, for insertion of abbreviations from the list into a pre-existing text, for converting selected words and phrases in the pre-existing text to abbreviations, for converting selected abbreviations in the pre-existing text to words and phrases, and for automatically converting a number of words and phrases to abbreviations, and abbreviations to words and phrases, throughout the pre-existing text, comprising:

(a) a computer having a memory, a central processing unit, and an input/output unit;

(b) a first data structure recorded in the memory, the first data structure encoding a plurality of words and corresponding abbreviations;

(c) a second data structure recorded in the memory, the second data structure encoding a plurality of abbreviations and corresponding words;

(d) pre-existing text in the memory containing words and abbreviations;

(e) a computer program executing in the central processing unit and defining structural and functional relationships among the plurality of words and the plurality of abbreviations, the computer program receiving information on the words and abbreviations to be selected from an operator through the input/output unit, and the computer program responding to operator selection of words and abbreviations, converting selected words to corresponding abbreviations and replacing the selected words in the pre-existing text with the corresponding abbreviations, converting selected abbreviations in the pre-existing text to corresponding words, replacing the selected abbreviations in the pre-existing text with the corresponding words, and inserting words and abbreviations into the text at any position selected by the user;

(f) wherein the computer program displays a list of abbreviations corresponding to selected words to the operator through the input/output unit;

(g) wherein the computer program displays a list of words corresponding to selected abbreviations to the operator through the input/output unit;

(h) wherein the computer program automatically converts words selected by the computer program throughout the pre-existing text to corresponding abbreviations and replaces the selected words in the pre-existing text with the corresponding abbreviations;

(i) wherein the computer program automatically converts abbreviations selected by the computer program throughout the pre-existing text to corresponding words and replaces the selected abbreviations in the pre-existing text with the corresponding words.

10. A data processing apparatus for maintaining and customizing a list of words, phrases, and abbreviations that are standard in a profession, industry, trade or occupation, for insertion of abbreviations from the list into a pre-existing text, for converting selected words and phrases in the pre-existing text to abbreviations, for converting selected abbreviations in the pre-existing text to words and phrases, and for automatically converting a number of words and phrases to abbreviations, and abbreviations to words and phrases, throughout the pre-existing text, comprising:

(a) a computer having a memory, a central processing unit, and an input/output unit;

(b) a first data structure recorded in the memory, the first data structure encoding any plurality of words and corresponding abbreviations;

(c) a second data structure recorded in the memory, the second data structure encoding a plurality of abbreviations and corresponding words;

(d) pre-existing text in the memory containing words and abbreviations;

(e) a computer program executing in the central processing unit and defining structural and functional relationships among the plurality of words and the plurality of abbreviations, the computer program receiving information on the words and abbreviations to be selected from an operator through the input/output unit, and the computer program responding to operator selection of words and abbreviations, converting selected words to corresponding abbreviations and replacing the selected words in the pre-existing text with the corresponding abbreviations, converting selected abbreviations in the pre-existing text to corresponding words, replacing the selected abbreviations in the pre-existing text with the corresponding words, and inserting words and abbreviations into the text at a position selected by the user;

(f) wherein the computer program displays a list of abbreviations corresponding to selected words to the operator through the input/output unit;

(g) wherein the computer program displays a list of words corresponding to selected abbreviations to the operator through the input/output unit;

(h) wherein the computer program automatically converts words selected by the computer program throughout the pre-existing text to corresponding abbreviations and replaces the selected words in the pre-existing text with the corresponding abbreviations;

(i) wherein the computer program automatically converts abbreviations selected by the computer program throughout the preexisting text to corresponding words and replaces the selected abbreviations in the pre-existing text with the corresponding words; and (j) wherein the computer program responds to operator input to select a position anywhere in the pre-existing text for insertion of an abbreviation, displays a list of words and abbreviations from the first data structure, and allows an operator to select an abbreviation for insertion at the selected position in the pre-existing text.

* * * * *

UNITED STATES PATENT AND TRADEMARK OFFICE
CERTIFICATE OF CORRECTION

PATENT NO.        : 7,475,343 B1                            Page 1 of 1
APPLICATION NO.   : 09/309831
DATED             : January 6, 2009
INVENTOR(S)       : Thomas C. Mielenhausen It is certified that error appears in the above-identified patent and that said Letters Patent is hereby corrected as shown below:

In column 6, line 34, after "abbreviations;" insert -- and --.

In column 7, line 7, after "at" and before "position", delete "a" and in its place -- any --.

In column 8, line 3, after "abbreviations;" insert -- and --.

In column 8, line 8, after "words" delete "; and", and in its place -- . --.

In column 8, delete lines 9 through 14.

Signed and Sealed this

Seventeenth Day of August, 2010

David J. Kappos
*Director of the United States Patent and Trademark Office*